Sept. 19, 1944.    R. LITTLE    2,358,582
PARACHUTE
Filed May 4, 1943    2 Sheets-Sheet 1

Inventor:
Royal Little
By
Attorney

Sept. 19, 1944.   R. LITTLE   2,358,582
PARACHUTE
Filed May 4, 1943   2 Sheets-Sheet 2

Inventor:
Royal Little
By
Attorneys.

UNITED STATES PATENT OFFICE 2,358,582

PARACHUTE

Royal Little, Providence, R. I., assignor to Textron Incorporated, a corporation of Rhode Island Application May 4, 1943, Serial No. 485,571

10 Claims. (Cl. 244—145)

My invention relates to parachutes and consists in improvements in the design and construction thereof to minimize oscillation during descent and ensure greater safety to the jumper or parachutist in landing.

Pilots and the crews of fighter and bomber planes are provided with parachutes for emergency escape from their planes and large numbers of chutes are used for landing paratroopers and their equipment and munitions. Up to the time of their use in warfare the problem of oscillation in parachutes did not attract wide attention, due to the fact that parachutes were used primarily for life-saving purposes and stunt jumps. Now, because of the wide use of parachutes in warfare this problem is of great importance as affecting the safe landing of paratroopers and their equipment. It is well known that excessive oscillation of a parachute during descent is dangerous to the jumper due to the fact that his actual rate of contact with the ground in landing may be very materially increased over the normal rate of descent. While some progress has been made in overcoming this condition by designing chutes of special shapes to reduce oscillation, such chutes have many disadvantages in packing due to the extreme yardage of fabric required and for other reasons.

The present improvement in the construction of parachutes has been developed after extended study and experimental tests covering a considerable period of time. It has been discovered from these tests that the degree of oscillation of a parachute varies substantially in proportion to the porosity and air-permeability of its canopy cloth. It appears that the cause of oscillation is the building up of an excess air pressure in the canopy which is prevented from escaping through the vent in the top and is therefore caused to spill across the perimeter of the canopy. The use of a vent-opening in the top of the canopy is designed to reduce oscillation, but the area of the vent must be limited as an opening of excessive size is dangerous, causing slow opening or complete failure to open, and furthermore, tending to increase the velocity of descent of the chute. Likewise, it has been found that increasing the porosity of the entire area of the canopy cloth of the parachute also results in retarding its opening and increasing its speed of descent. To overcome these difficulties, therefore, I have discovered that by varying the porosity of air-permeability of the fabric from the perimeter to the apex of the canopy, that is by providing a relatively high air-permeability in the skirt of the canopy and a much lower permeability in the region of its apex or center, the tendency to oscillate is greatly minimized and, in fact, substantially eliminated under practically all conditions.

When a jumper leaps from a plane and his chute is released from the pack the slipstream from the propeller will blow the canopy towards the rear and stream it out in substantially horizontal position. Then, as the chute opens and the jumper swings down in suspension therefrom, momentum will carry him beyond the perpendicular and he will swing back and forth, and this pendulous motion will cause the parachute to sway and set up what may be termed a "primary" oscillation. During the oscillation of the chute the air in the canopy will spill across its perimeter, first on one side and then on the other, thereby tending to continue the oscillations. The oscillating motion of the chute may be dampened somewhat as its descent continues, but there are other factors which act to set up a secondary oscillation, for example, variable atmospheric conditions. Up-currents of warm air, ground winds, and eddy currents, all have the effect to disturb the equilibrium of the parachute and set up violent oscillation therein. Such oscillation of the chute is dangerous to the jumper in interfering with his control of the direction of descent and preventing him from landing on his feet. Moreover, it may cause him to be swung against the ground at a high rate of contact and at such an angle as will result in broken ankles and other bodily injury. By preventing such excessive oscillation the present improvement in the construction of parachutes ensures greater safety to the jumper in landing and also provides for landing valuable materials and equipment without breakage or damage.

A preferred form of construction of my improved parachute is described in the following specification and illustrated by the accompanying drawings, in which.

Figure 1:
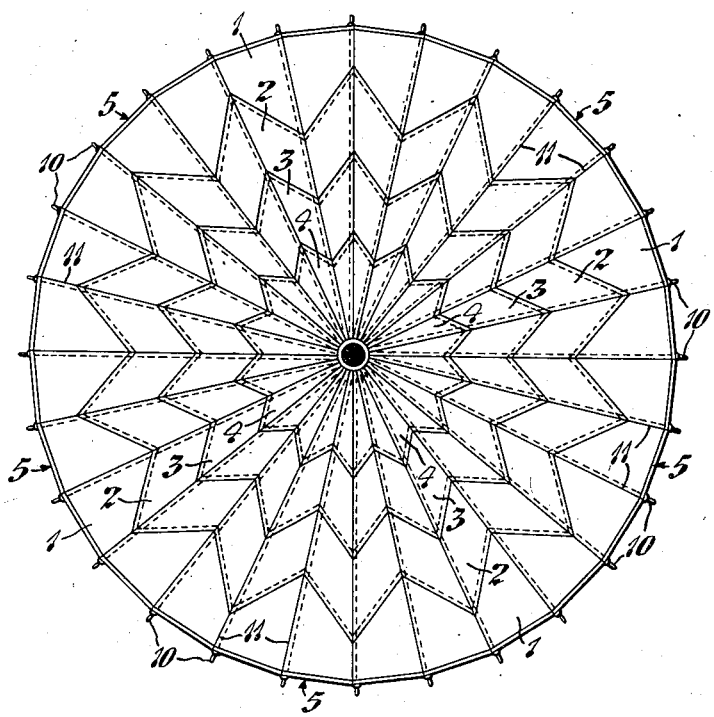
Fig. 1 is a plan view of the canopy of a parachute embodying the present improvements.
Figure 2:
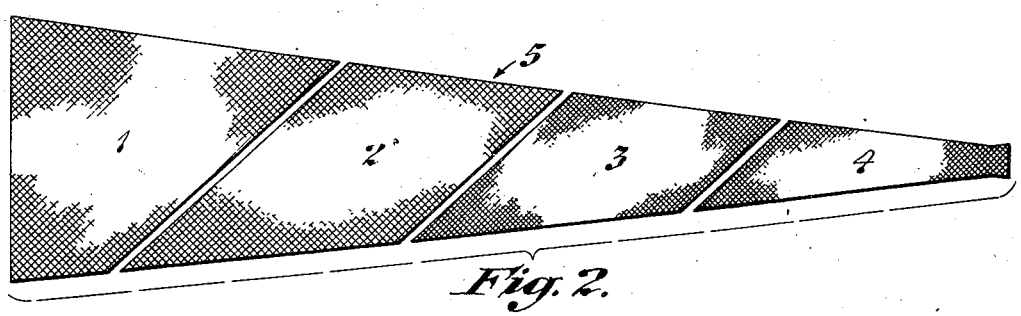
Fig. 2 is an enlarged plan view of the multiple panels of one of the gores from which the canopy is constructed.
Figures 3, 4:
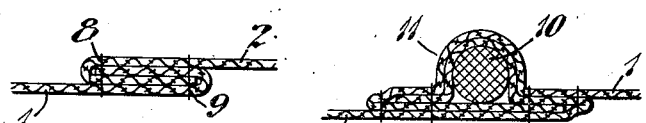
Fig. 3 is a further enlarged transverse sectional view taken through one of the diagonal or oblique seams which unite the panels in the gores of the canopy.
Fig. 4 is a similarly enlarged transverse sectional view taken through a seam between the gores and showing the method of securing the shroud lines or cords thereto.

Referring to the drawings, Fig. 1 is a plan view showing the construction of a parachute canopy, sometimes called the "sail," made up of twenty-eight gores with each gore 5 composed of four panels 1, 2, 3 and 4. As shown in Fig. 2, the gores 5 are triangular in outline with a relatively short base, and in accordance with a usual method of construction the panels 1, 2, 3 and 4 are made in the shape of rhomboids by cutting the fabric on the bias. The several panels are fastened together by folding their marginal portions into interlocking seams as shown in Fig. 3, with two lines of zigzag stitching along the margins at points 8 and 9. The shroud lines 10, usually in the form of braided cords, extend diametrically across the canopy overlying the seams 11 by which the gores 5 are fastened together and secured in place in the manner illustrated in Fig. 4. Usually, a circular vent-opening is left at the center or apex of the canopy with its edge bound by a strip of tape or otherwise to prevent the cloth from tearing or fraying. It will be observed by reference to Fig. 1 that the several shroud lines or cords 10 converge and cross at the apex and it is the common practice to gather these cords together for the purpose of suspending the chute for drying or for manipulating the canopy in folding it for packing. In accordance with my present improvement I may leave only a very small opening at the center of the canopy, just large enough for convenient grasping of the cords or, in other cases, I may apply a detachable cap or cover over an opening of normal size to entirely prevent the escape of air through the vent, the purpose of such an arrangement being set forth more fully hereinafter.

It has been stated that in accordance with the present improvement I propose to vary the porosity of the fabric in different regions of the canopy area to render it of relatively high air-permeability at the skirt with a lesser porosity and relatively low air-permeability at the center of the canopy. This variation or gradation in the porosity of the canopy fabric may be accomplished in several different ways. For example, the cloth may be woven in the loom to control its porosity by regulating the closeness of its threads, that is with the number of warp and filling threads to the square inch porportioned to regulate their spacing and thereby give a greater or lesser area of the interstices or pores between the crossing threads. As another method, the fabric may be coated or treated with a filler to close the pores between the strands. Preferably, however, in accordance with one feature of the present invention, the porosity of the fabric is controlled by closing the pores to a greater or lesser extent by mechanical treatment of the cloth. The fabric canopy may be constructed of silk or of synthetic materials, such as rayon or nylon, and in either case the processing treatment will be the same. By flattening the strands under compression and heat the pores or interstices between the strands may be closed to a greater or lesser degree as required. By the simple operation of passing the woven fabric through heated calender rolls and regulating their pressure, any degree of porosity in the fabric may be secured in accordance with the extent of flattening of the strands. For example, if extreme density is required to provide minimum porosity of the fabric the cloth may be run through the calender rolls several times under extreme pressure; whereas, for greater porosity and air-permeability the fabric will be subjected to less pressure and fewer applications of the calendering process. By this method I may provide strips of fabric of different porosity and air-permeability by a simple and extremely economical method of manufacture.

As a result of hundreds of tests made with parachutes dropped from towers with weighted dummies attached, I have discovered that standard parachutes of commercial manufacture vary widely in the air-permeability of their fabric. These tests show that a parachute having a canopy of relatively low porosity fabric will open rapidly, but will oscillate violently during descent. On the other hand, a parachute in which the canopy is of relatively high porosity cloth will not open as rapidly but will be almost free from oscillation during descent. This latter type of parachute is called a "breather" since it has a slow rhythmic contraction and expansion of the diameter of the canopy at the skirt during descent. However, with a canopy having a high degree of porosity the rate of descent is materially increased, in some cases to the danger point. From these experiments and numerous drop tests from towers I have evolved an empirical formula for grading the variation in air-permeability of the fabric in the canopy of a parachute designed and constructed in accordance with the present invention.

In the present specification I employ figures expressing the porosity value of the fabric in accordance with the U. S. Bureau of Standards formula developed with an air-permeability testing machine. For example, the figure 300 may express the air-permeability of a fabric in which 300 cubic feet of air will flow through one square foot of the cloth in one minute of time under a pressure of one-half inch of water. Using such values I may construct the lower panels in the skirt of the canopy from fabric having an air-permeability of from 250 to 300. That is to say, the two lower panels 1 and 2 of each gore may have a mean or average air-permeability of approximately 275, even though the density of the cloth may vary somewhat throughout its area. For the upper panels 3 and 4 of each gore 5 I may use a fabric having an air-permeability of from 20 to 40 or a mean permeability of say 30 over its whole area. Preferably, with the improved parachute constructed from fabric panels having these values in air-permeability I provide a very small vent-opening at the top of the canopy or, in other cases, I may cover the vent-opening with a fabric cap or closure of low porosity which may be partly or wholly removed to give access to the shroud lines in handling the chute for drying and packing.

Numerous tests with parachutes made in accordance with the above specifications and dropped with dummies attached demonstrated the following results: With a twenty-eight foot parachute using a pilot chute for opening it, the opening time was approximately 3.5 seconds and the rate of descent approximately 17 ft. per second. Using a static line attached to the plane for drawing the parachute out of its pack into the propeller blast it will open in approximately two seconds. Most important, this design of chute showed very little tendency to oscillate under varying atmospheric conditions, wind pressure and other natural phenomena. Careful observation of the descent of several of these parachutes showed a breathing action at the skirt whereof excessive pressure under the canopy was relieved without spilling the air across its edge. Furthermore, it is believed that the excellent results obtained, that is rapid opening and relatively slow descent, are due to the action and reaction of the air forces within the confines of the canopy.

Figure 5:
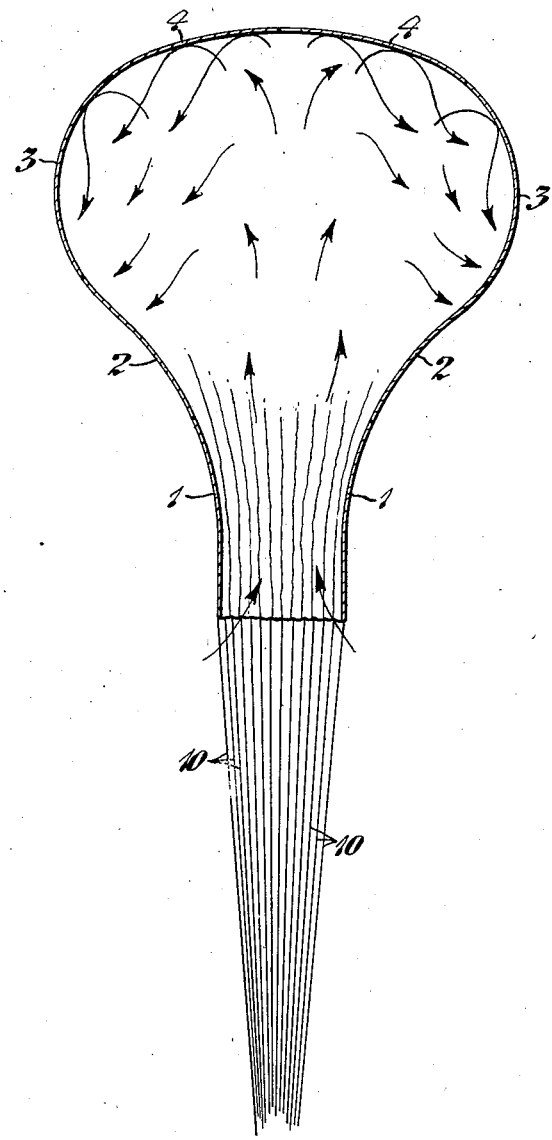
Fig. 5 is a diagrammatic view illustrating the action of the air pressure in opening the parachute.

Fig. 5 of the present drawings is a diagrammatic view illustrating the action of the air forces during the opening of the parachute. It is my theory, which appears to be substantiated by repeated tests, that during the initial opening of the chute while the orifice at the bottom or perimeter of the canopy is relatively constricted the air passing therethrough impinges against the upper central region of the interior of the canopy which is constructed of relatively dense and low porosity fabric preventing its escape therethrough. Consequently, there is a downward reaction of the moments of force tending to extend the pressure within the skirt of the canopy to cause its inflation and thereby expedite the complete opening of the chute. At the same time, any excessive air pressure is exhausted through the pores in the high permeability fabric of the skirt with a counterbalancing or steadying effect as the chute descends to maintain it in substantial equilibrium. Therefore, while my present improvement provides for the necessary rapid opening of the chute and a relatively slow rate of descent, the peculiar and novel construction of the fabric in the canopy has the effect to dampen and, under most conditions, entirely eliminate oscillation to ensure against injury to the jumper in landing.

While I have herein described a preferred form of construction of my improved parachute it is to be understood that modifications may be made in its design and construction within the spirit and scope of the invention. For example, the porosity of the canopy fabric may be varied in other ways, by gradation between all of the several panels of each gore or, if the chute is constructed with gores of a single length of cloth, the gradation of its porosity might be effected by calendering different parts therealong to greater or lesser extent, or by any other means such as applying a coating or filler in graduated amounts.

It will be observed from the foregoing specification that my present improvement solves a serious problem, long present but heretofore having no satisfactory solution. By eliminating oscillation in parachutes used as life-saving equipment or for landing troops the present invention provides for safety of the jumpers, removing the danger of broken limbs or bodily injury, and also makes for expeditious proper landing of paratroops and the dropping of their supplies and equipment without damage thereto.

Therefore, without limiting myself to the exact form of construction of the invention as herein shown and described, I claim:

1. A parachute comprising a canopy constructed of fabric with a high degree of air-permeability in its skirt and relatively low air-permeability in its upper portion.

2. A parachute comprising a canopy having a region of the fabric at its skirt of maximum porosity and a region of the fabric at the top of the canopy of minimum porosity.

3. A parachute comprising a canopy constructed of fabric and varying in air-permeability from its perimeter to its center with the highest air-permeability in the region of its skirt and the lowest permeability in the region of its center.

4. A parachute comprising a canopy constructed of fabric having different degrees of air-permeability, the permeability of its skirt being from 250 to 300 cubic feet of air per square foot per minute, and the permeability in the region of its center being from 20 to 40 cubic feet of air per square foot per minute.

5. A parachute comprising a canopy devoid of a central vent-opening and constructed from fabric with a high degree of air-permeability in the region of its skirt and relatively low air-permeability in the region of its center.

6. A parachute comprising a canopy constructed with triangular fabric gores each composed of a plurality of connected panels, the cloth in the lower panels having a high degree of air-permeability and the cloth in the upper panels having a relatively low degree of air-permeability.

7. That method of constructing a parachute which consists in forming a circular canopy of fabric by assembling a plurality of gores united along their longer edges and treating the fabric to close the interstices between its threads to render the cloth of low porosity at the central region of the canopy and of high porosity at the skirt.

8. That method of constructing a parachute consisting in cutting a fabric into triangular strips or gores, treating the strips to control the porosity of the fabric by closing the pores between the threads thereof whereby to render the fabric of high air-permeability at the larger end of each gore and relatively low air-permeability in the region of its upper end and assembling the gores by uniting them along their longer edges to form a circular canopy.

9. That method of constructing parachutes consisting in cutting fabric into panels to form triangular gores, selecting sections of fabric of high air-permeability for the lower panels of the gores and sections of relatively low air-permeability for the upper panels of the gores, and uniting the gores along their edges to form a circular canopy.

10. A method of constructing parachutes consisting in calendering separate strips of fabric under heat and greater or lesser pressure to flatten the threads therein and give different strips different degrees of porosity, cutting panels from the strips, selecting panels from the different strips and uniting them in the gores with the fabric panels of high porosity at the larger end of the gores and the panels of relatively low porosity at the upper end of the gores, and uniting the gores at their longer edges to form a circular canopy.

ROYAL LITTLE.